United States Patent [19]

Janerstål et al.

[11] Patent Number: 4,558,853
[45] Date of Patent: Dec. 17, 1985

[54] ADJUSTABLE CLAMP FOR HOLDING OBJECTS SECURELY IN POSITION

[75] Inventors: Tommy Janerstål, Ellös; Sven H. Yngvesson, Floda, both of Sweden

[73] Assignee: Partille Tool Aktiebolag, Partille, Sweden

[21] Appl. No.: 567,859
[22] PCT Filed: Apr. 12, 1983
[86] PCT No.: PCT/SE83/00133
  § 371 Date: Dec. 8, 1983
  § 102(e) Date: Dec. 8, 1983
[87] PCT Pub. No.: WO83/03567
  PCT Pub. Date: Oct. 27, 1983

[30] Foreign Application Priority Data

Apr. 13, 1982 [SE] Sweden .................. 8202296

[51] Int. Cl.⁴ .................................. B23Q 3/18
[52] U.S. Cl. ............................. 269/71; 269/72; 269/84
[58] Field of Search ............. 269/45, 71, 72, 75, 269/81–85, 91

[56] References Cited

U.S. PATENT DOCUMENTS

| | | | |
|---|---|---|---|
| 2,444,727 | 7/1948 | Bush | 269/72 |
| 2,495,065 | 1/1950 | Hull | 269/72 |
| 3,089,478 | 5/1963 | Jones | 269/82 X |
| 3,103,352 | 9/1963 | Steffen | 269/84 X |
| 4,253,649 | 3/1981 | Hewson | 269/82 X |
| 4,275,872 | 6/1981 | Mullis | 269/72 |
| 4,500,077 | 2/1985 | Coxon | 269/45 |

Primary Examiner—Frederick R. Schmidt
Assistant Examiner—Steven P. Schad

[57] ABSTRACT

An adjustable clamp for holding objects securely in position comprising at least one arm (1) which exhibits one articulated arrangement (4, 5) arranged at each of the two ends of the arm. The articulated arrangement exhibits two pivot pins (6, 8, 7, 9) arranged at an angle to each other. The object (36) is held securely by a clamping arrangement attached to the articulated arrangement. Each articulated device (4, 5) exhibits, free to move in relation to the arm (1), an articulated body (15) with a curved articulated surface (16) which is in contact with and is so arranged as to move relative to a corresponding curved articulated surface (17) in an articulated component (12) attached to the ends (2, 3) of the arm. The articulated body also exhibits a flat articulated surface (18) which is contact with and may be turned relative to a corresponding flat surface. One of the pivot pins (8) in each articulated arrangement (4, 5) extends through the articulated component and the articulated body and forms a releasable locking arrangement for the arm and for the clamping arrangement. The locking arrangement is capable of adjustment between a locked position in which the articulated surfaces are tightly clamped to each other in a pre-set position by said pivot pin and a released position in which the articulated surfaces are capable of moving relative to each other. The articulated components (12) of the arm (1) are executed in the form of hook-like components, each of which is open to the side in its own particular direction relative to the longitudinal direction of the arm.

4 Claims, 8 Drawing Figures

ADJUSTABLE CLAMP FOR HOLDING OBJECTS SECURELY IN POSITION

TECHNICAL FIELD

The present invention relates to an adjustable clamp for holding objects securely in position comprising at least one arm which exhibits one articulated arrangement arranged at each of the two ends of the arm, said articulated arrangement exhibiting two pivot pins arranged at an angle to each other, whereby said object is so arranged as to be held securely by means of a clamping arrangement attached to the articulated arrangement.

TECHNICAL PROBLEM

The purpose of the present invention is to propose an adjustable clamp by means of which objects may be set in a large number of different positions and may be aligned in different directions. Examples of such objects include so-called stops which are intended to hold workpieces in position during machining operations, for example when drilling at a pre-determined point. For this purpose, the clamp is adjusted in conjunction with the stop after the first workpiece has been placed in the desired position, whereupon the stop is tightened against a suitable edge or surface. Once this has been done, a series of identical workpieces can be located in identical positions enabling a repeatable machining operation to be performed.

SOLUTION

The aforementioned purpose is achieved by means of a clamp which is characterized in that each articulated device exhibits, free to move in relation to the arm, an articulated body with a curved articulated surface which is in contact with and is so arranged as to move relative to a corresponding curved articulated surface in an articulated component attached to the ends of the arm and with a flat articulated surface which is in contact with and is so arranged as to be capable of being turned relative to a corresponding flat surface, in that one of the pivot pins in each articulated arrangement extends through the articulated component and the articulated body and forms a releasable locking arrangement for the arm and for the clamping arrangement by being adjusted between a locked position in which the articulated surfaces are tightly clamped to each other in a pre-set position between said pivot pins and a released position in which the articulated surfaces are capable of moving relative to each other, and in that the articulated components of the arm are executed in the form of hook-like components, each of which is open to the side in its own particular direction relative to the longitudinal direction of the arm.

DESCRIPTION OF THE DRAWINGS

The invention is described below in greater detail in relation to a couple of typical embodiments with reference to the accompanying drawings, in which.

BEST MOST OF CARRYING OUT THE INVENTION

Figure 1:
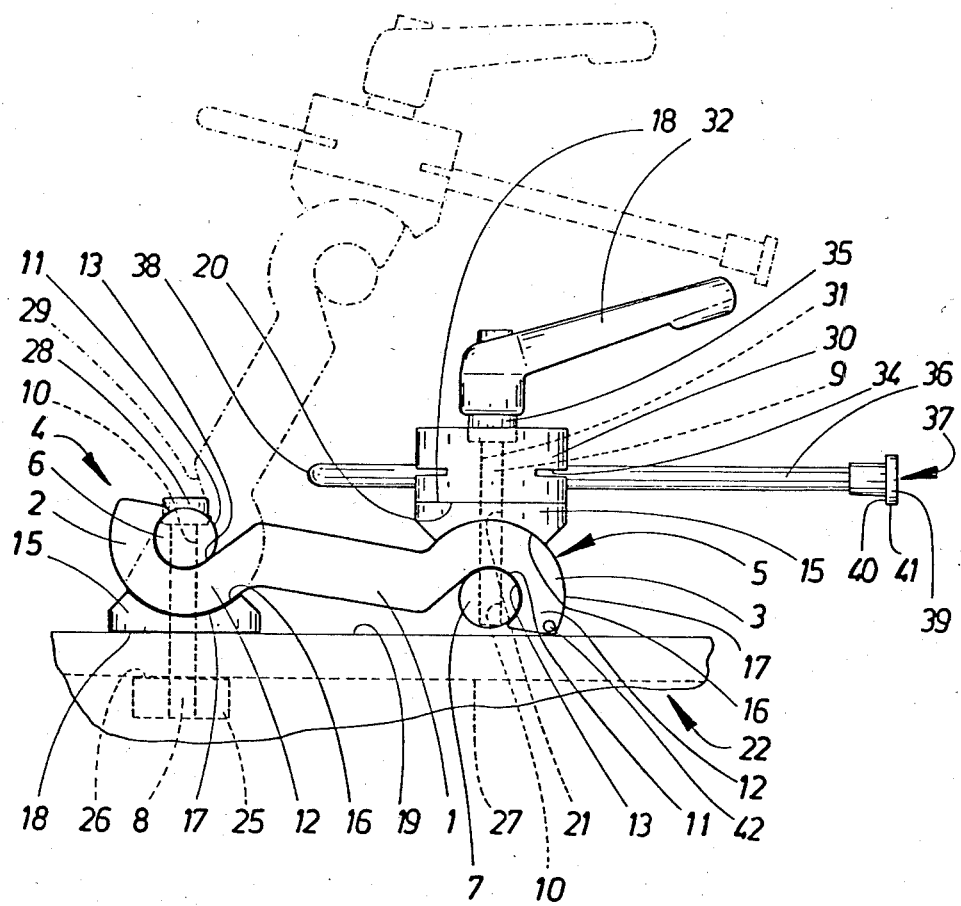
FIG. 1 shows a side view of the clamp in accordance with the invention in a first typical embodiment, shown in two different positions.

The clamp in accordance with the first embodiment illustrated in FIGS. 1–5 consists of an arm 1, each of the ends 2, 3 of which is provided with its own articulated arrangement 4, 5. Each and every one of the articulated arrangements 4, 5 exhibits a first pivot pin 6, 7 which is horizontal in the typical embodiment shown, and a second pivot pin 8, 9 which is vertical in the typical embodiment shown with regard to one of the articulated arrangements 4 but which is capable of being set to various angles along various vertical planes with regard to the second articulated arrangement 5. The first pivot pin 6, 7 in the two articulated arrangements 4, 5 is executed in the form of a cylindrical body, whereas the second pivot pin 8, 9 is executed in the form of a screw which in the typical embodiment shown in one of the articulated arrangements 4 is an Allen screw which extends through a transcurrent bore 10 in the pivot pin 6, 7. The first pivot pin 6, 7 thus exhibits an articulated surface 11 in the form of a cylinder jacket. The arm 1 exhibits at either end an articulated component 12 forming part of the articulated arrangement 4, 5, said articulated component when viewed from the side having a hook-like appearance and exhibiting a similarly curved, concave articulated surface 13 in the form of a cylinder jacket which is designed to make contact with the articulated surface 11 of the ivot pin 6, 7. In the articulated component 12 is arranged a long groove 14, as may best be appreciated from FIG. 3 and FIG. 4, through which the pivot pin 6, 7 extends.

In each and every one of the articulated arrangements 4, 5 is also incorporated an articulated body 15 which exhibits a concave articulated surface 16 in the form of a cylinder jacket, designed to make contact with a convex articulated surface 17 in the form of a cylinder jacket on the articulated component 12 of the arm in each and every one of the articulated arrangements 4, 5. These two articulated surfaces 16, 17 exhibit essentially the same radius of curvature in each and every one of the articulated arrangements, whilst the articulated surfaces 11, 13 exhibit essentially the same mutual radius of curvature. All the curved articulated surfaces 11, 13, 16, 17 are coaxial with the pivot pin 6, 7. The articulated bodies 15 also exhibit a flat articulated surface 18 intended to slide against a second flat surface 19, 20 so as to permit articulated movement about the pivot pins 8, 9. The articulated surfaces 11, 13, 16, 17 in the form of a cylinder jacket are intended to slide in pairs against one another in order to permit articulated movement about the pivot pins 6, 7. The articulated bodies 15 exhibit a transcurrent bore 21 for the pivot pins 8, 9.

The lower articulated arrangement 4 in accordance with the first typical embodiment is executed in the form of an articulated holder which is capable of being moved along a guide arrangement 22, such as is found, for instance, on machine tools such as boring machines for the purpose of permitting the attachment of, for instance, clamping arrangements such as collet jaws or similar arrangements for holding the workpiece securely in position. The guide arrangement 22 is executed with a channel 23, for instance of T-shaped cross-section and with a narrower part which exhibits a groove 24 open towards the top, through which the vertical pivot pin 8 in the articulated arrangement 4 extends and which with its lower end is in threaded engagement with a suitable square nut 25 which is able by means of its upward-facing guide surface 26 to slide against, and by tightening up the Allen screw 8 to be clamped against a downward-facing guide surface 27 in the guide arrangement 22. The shape of the nut 25 prevents it from turning at the same time as a turning motion is imparted to the Allen screw 8.

By means of the articulated arrangement 4 which serves as an articulated holder the clamp may be moved to any desired position along the guide arrangement 22 with the Allen screw 8 which serves as a pivot pin slackened off slightly. With the screw in that position, the arm 1 may be set to any desired angle of articulation about both the vertical pivot pin 8 and the horizontal pivot pin 6 that is to say it may be articulated to any desired angle in the vertical plane and to any desired angle in the horizontal plane. Articulation about the vertical pivot pin 8 may take place through a full 360 degrees, whereas articulation about the horizontal pivot pin 6 takes place within a certain given angular interval, in respect of which FIG. 1 shows the two end positions in the typical embodiment in question. The solid line shows the lower end position with the arm 1 in contact with the guide arrangement, and the dotted and dashed lines show the upper end position with the head 28 of the screw forming a stop against a flat contact surface 29 on the arm 1. The head 28 of the screw is in this instance slightly recessed into the horizontal pivot pin 6, but is intentionally not entirely recessed so as to enable it to serve as a stop permitting the Allen screw to be tightened and slackened by means of a hexagon key. The stop will also prevent any unintentional articulation of the arm 1 to the point at which the articulated joint will fall apart.

By activating one and the same element, that is to say the vertical pivot pin 8, it is possible for locking to take place in the articulated clamp on the guide arrangement 22 and in addition for the arm 1 to be locked relative both to the horizontal pivot pin 6 and to the vertical pivot pin 8, thereby achieving the very effective and stable locking of the arm 1 in its desired position.

The second articulated arrangement 5 has its hook-like articulated component 12 facing in the opposite direction in relation to the articulated component 12 in the articulated arrangement 4. In this way the convex articulated surface 17 of the articulated component faces essentially upwards, with the articulated body 15 resting on the articulated component 12 and in turn supporting a clamping arrangement 30 which exhibits said flat surface 20, which is in contact with the flat articulated surface 18 of the articulated body 15. The pivot pin 9 extends through a transcurrent bore 31 in the articulated body 30 through the transcurrent bore 21 in the articulated body 15 and the groove 14 in the articulated component 12 and is screwed into the horizontal pivot pin 7 by its end which is provided with a screw thread. The pivot pin 7 thus exhibits a bore provided with a screw thread which may, for example, be transcurrent. The other bores need not be provided with a screw thread. In this embodiment, the pivot pin 9 in the articulated arangement 5 is not an Allen screw, but is a slotted-head screw or a threaded pin which, at its upper end, exhibits an operating lever 32, by means of which the pivot pin 9 may be turned for the purpose of being tightened and slackened. The operating lever 30 is capable in a previously disclosed fashion by imparting a movement in the longitudinal direction of the pivot pin 9 of being moved between different articulated positions without the need to cause the pivot pin 9 to turn with it, enabling the operating lever 32 to be set to various positions of engagement enabling the pivot pin to be brought into an appropriate position depending on the space available.

Figure 2:
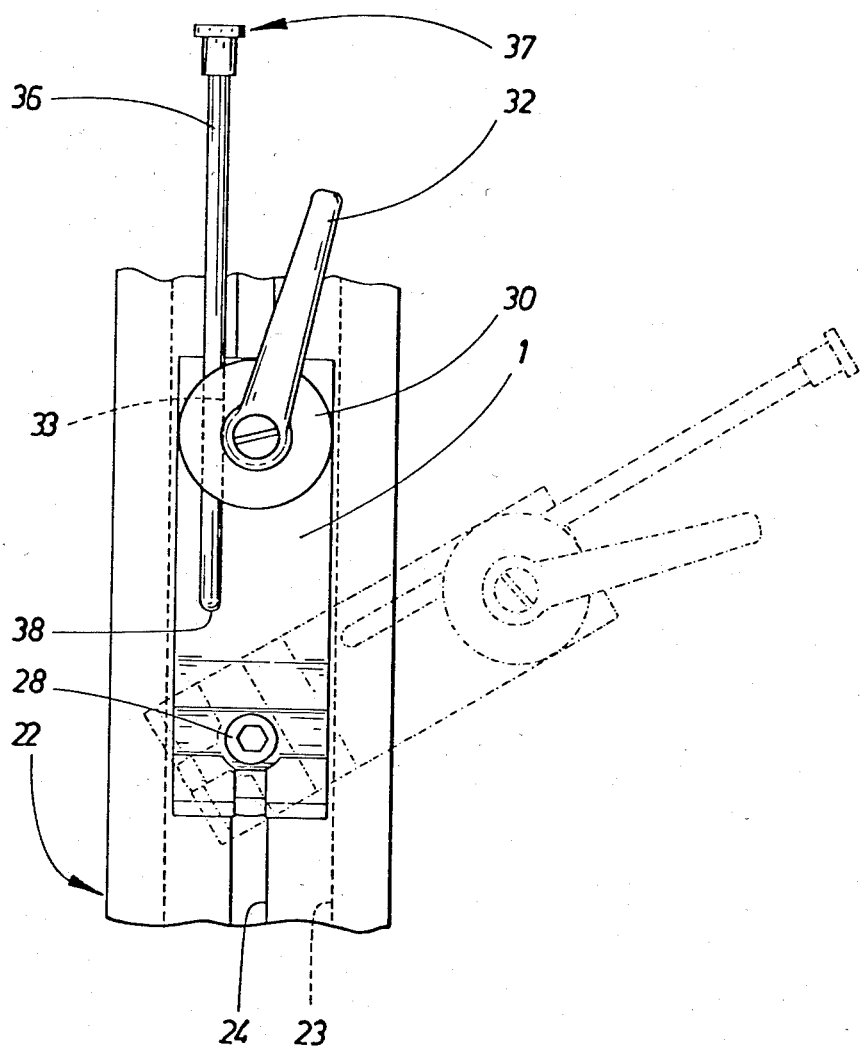
FIG. 2 shows a view from above of the clamp in accordance with FIG. 1, shown in two different positions.

The clamping arrangement 30 is essentially cylindrical in form in the embodiment shown and is also provided with a transcurrent bore 33, as may best be appreciated from FIG. 2, which extends at right angles to the pivot pin 9 and eccentrically from it. Through this bore 33 extends transversely across the pivot pin 9 a slot 34 which is so dimensioned as to permit the bore 33 to be restricted to a certain extent by a head 33 of the pivot pin 9, which is forced into a depression in the clamping arrangement 30.

The clamp in accordance with the invention is so arranged so to be capable in a number of different positions of supporting an object which, in the embodiment shown, is in the form of a rod-shaped clamping arm 36 extending through the bore 33, said arm being of circular cross-section in the embodiment shown. This clamping arm is so arranged as to be tightly secured to the clamping arrangement 30 in the desired position and represents, for example, the object which is intended to be supported by the clamp in accordance with the invention in the desired position and in the desired direction. The clamping arm 36 in the embodiment shown is executed in the form of an extendable arm intended to serve as a stop when machining the workpiece. The extendable arm 36 accordingly exhibits at either end a stop organ 37, 38. The first stop organ exhibits a flat front contact surface 39 and a flat rear contact surface 40 and also a contact edge 41. The second stop organ 38 is in the form of a spherically rounded end part to the extendable arm 36. The extendable arm 36 is capable of being turned through its ability to be removed from the bore 33, turned, and inserted into the bore from the opposite direction. At the same time the clamping arrangement 30 is capable of being turned through 360 degrees about the pivot pin 9 enabling the bore 33 to be positioned in any desired direction, and even in one and the same direction but on either side of the pivot pin 9. The extendable arm 36 can thus be turned in such a way that the stop organ 37 or 38 may be selected depending on the nature of the surface or the edge of the workpiece against which the stop organ is to make contact.

The articulated arrangement 5 thus permits the adjustment of the clamping arm 36 to any desired angular position in both the horizontal plane and the vertical plane by means of the operating lever 32 after having slackened off the articulated arrangement, that is to say by screwing out slightly the pivot pin 9 from the bore 10 in the pivot pin 7, by causing the clamping arrangement 30 to turn about the pivot pin 9 by sliding the flat articulated surfaces 20, 38 against each other and by sliding the articulated surfaces 11 and 13 and 16 and 17 in the form of cylinder jackets against each other. With the articulated arrangement 5 released, the clamping arm 36 will also be released so that it may be moved in its longitudinal direction to any desired position. For the purpose of placing the articulated arrangement 5 in the locked position, the operating lever 32 is turned in a sense which will cause it to be screwed further into the bore 10 in the pivot pin 7, when the pivot pin will be clamped against the articulated component 12, thereby creating such friction both in the articulated surfaces 11, 13 and 16, 17 in the form of cylinder jackets and in the flat articulated surfaces 20, 38 that locking will take place, that is to say that the pivot pin 9 will be held securely in the desired position and that the clamping arm 36 will be held in the desired angular position. In the case of the upper articulated arrangement, the ability to articulate in the vertical plane will be limited by the contact of the pivot pin 9 with the stop at either end of the groove 14. At the outer end of the groove, the stop 42 is formed by a pin extending transversely across the groove, said pin extending through a bore in the articulated component 12 of the arm 1, whilst the second stop 43 (see FIG. 3) is formed by the inner end of the groove 14.

Locking by means of the operating lever 32 takes place in two locking stages, however. The first locking stage occurs in accordance with the above in conjunction with the first tightening operation by means of the operating lever, when the angular positions in accordance with the above are fixed, whilst the clamping arm 36 is still capable of being moved in its longitudinal direction. After further tightening by means of the operating lever 32, the clamping arm 36 will also be held securely by the slight compression of the components of the clamping arrangement 30, which are separated by the slot 34. The depth of the slot is, in fact, calculated in relation to the flexibility characteristics of the material used in the clamping organ, which may be made from a light alloy, for instance, so that locking will first occur in the sliding surfaces of the articulated arrangement 5, followed by locking of the arm in the bore.

Figure 3:
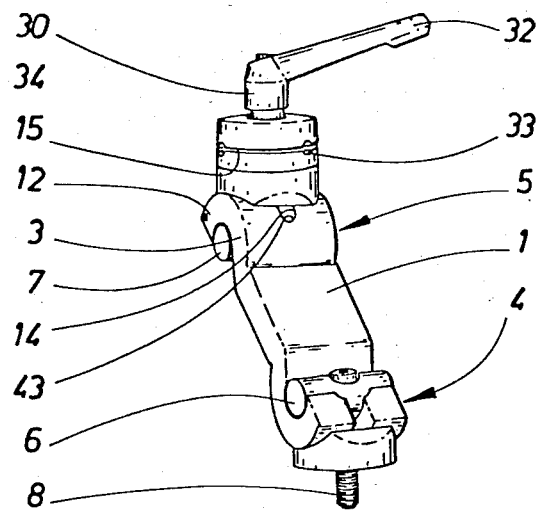
FIG. 3 and FIG. 4 show two perspective views of the clamp in accordance with FIG. 1, whilst
Figure 4:
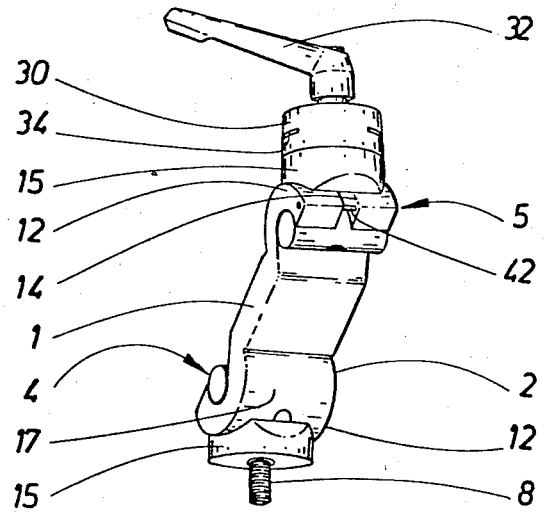

FIG. 3 and FIG. 4 show the appearance of the arm 1 and the sliding surfaces of the articulated arrangements 4, 5, which provide exceptionally stable and effective locking due to the great width of the articulated surfaces.

Figure 5:
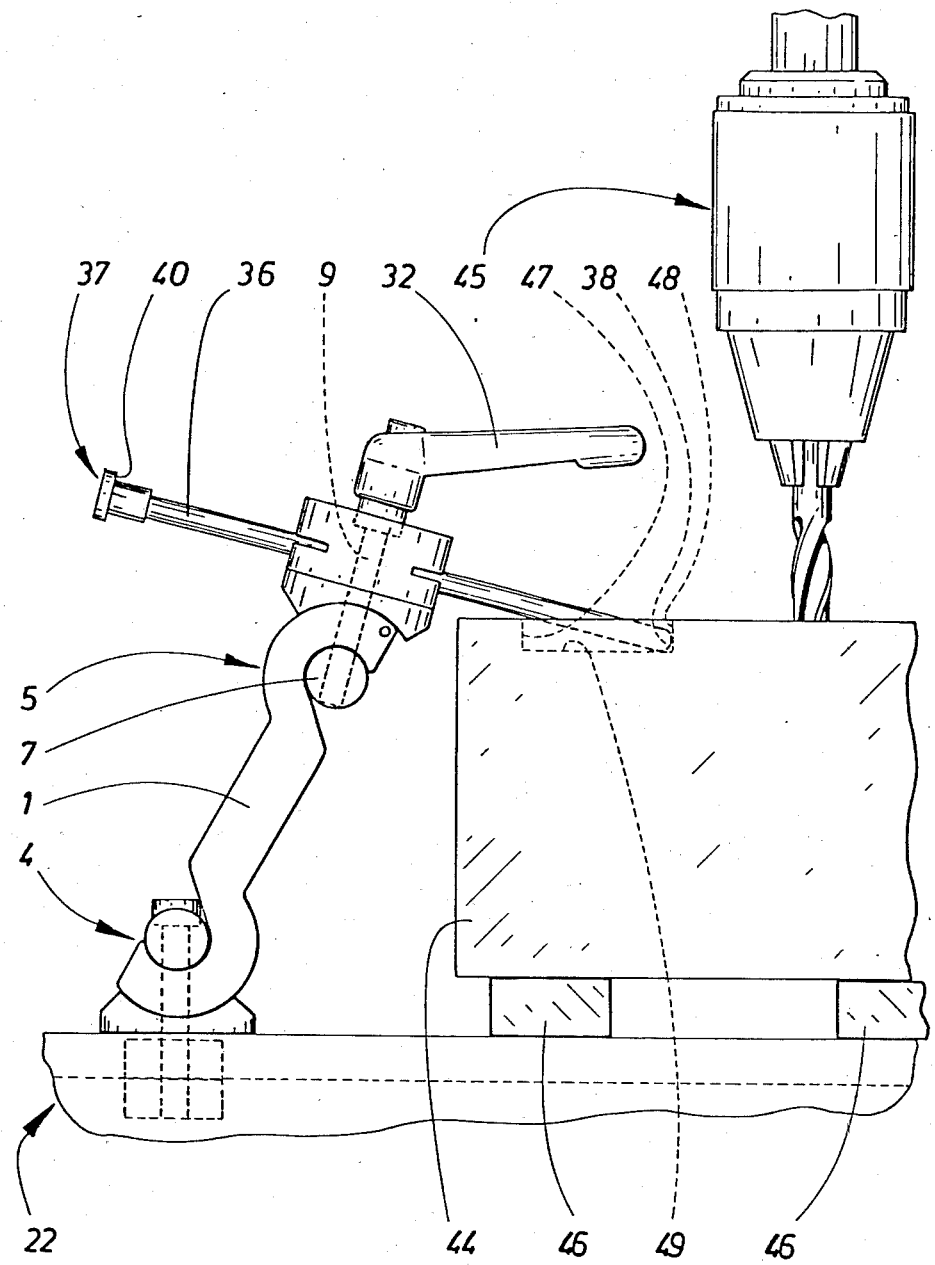
FIG. 5 shows a partical application in conjunction with a drilling operation.

FIG. 5 shows an application in which use is made of the clamp in accordance with the invention as a stop by means of which to determine the position of a workpiece 44 during the machining of said workpiece, in this case drilling by means of a drilling machine 45. The purpose of the stop is to permit a machining operation, in this case drilling, to be performed at one and the same point on all the workpieces when drilling a large number of workpieces 44 which are identical with each other. For this purpose, the first workpiece 44 is placed in the desired position so that the machining operation may be performed at the correct point, with the clamping arrangement in accordance with the invention initially being retracted from the position indicated in FIG. 5. The workpiece 44 is raised to the desired height by means of packing pieces 46 and is prevented from moving in directions across the transverse plane of the paper by means of a vice (not shown) or by means of an adjustable stop in the form of an adjustable supporting surface which is brought into contact with workpiece. The clamp and the stop in accordance with the invention are then advanced with the two articulated arrangements 4, 5 in the released, i.e unlocked, position in which the clamp may be moved along the guide 22 into the appropriate position in relation to the workpiece 44. For this purpose, the lower articulated arrangement 4 is tightened up slightly so as to give it a certain degree of location, yet still to permit articulated movement should this be necessary during the adjustment of the clamp. The upper articulated arrangement 5 is left in the released state so that the clamping arm 36 may be set to the desired angular position by turning it about both the horizontal pivot pin 7 and the pivot pin 9. Use is made of the rounded stop organ 38 in this case, although the second stop organ 37 could also be used in this instance. In the workpiece 44 shown, the position of the bore which is to be executed is dependent on the position of a recess 47, which in this case is cylindrical, for which reason the stop organ 38 is brought into contact with an internal corner of said recess 47, that is to say with both the edge surface 48 and the bottom surface 49. The necessary adjustment is best made in this case with the clamping arm 36 being both adjusted in the angular sense and advanced in a longitudinal sense, whereupon locking of the clamping arm takes place against both angular movement and longitudinal movement. When adjustment is to be made directly towards a surface, it is preferable for the aforementioned locking operation to take place in two stages, with the angular positions being adjusted initially, followed by the advancement of the clamping arm to the point at which the contact organ 37 or 38 comes into contact with the surface in question. The rounded contact surface 37 or the rounded stop organ 38 may also be used, for example, in bores to permit the introduction of the clamping arm 36 into bores and to determine the position against any of the surfaces of the bores. The aforementioned rearward-facing contact surface 40 may be used in the event of the surface of the workpiece facing away from the clamp being most suitable for holding the workpiece in position. Once the clamp and the stop organ have been adjusted, the position of the workpiece 44 can be reproduced for all subsequent workpieces, which will require to be advanced up to the stop organ, in so doing assuming the same position as the first workpiece. In this way the machining operations will take place at one and the same point on each workpiece. Thus, in the case illustrated here, the recess 47 exhibits a sideways-facing opening which enables the workpiece to be removed without the need to move the clamp or the stop organ.

Figure 6:
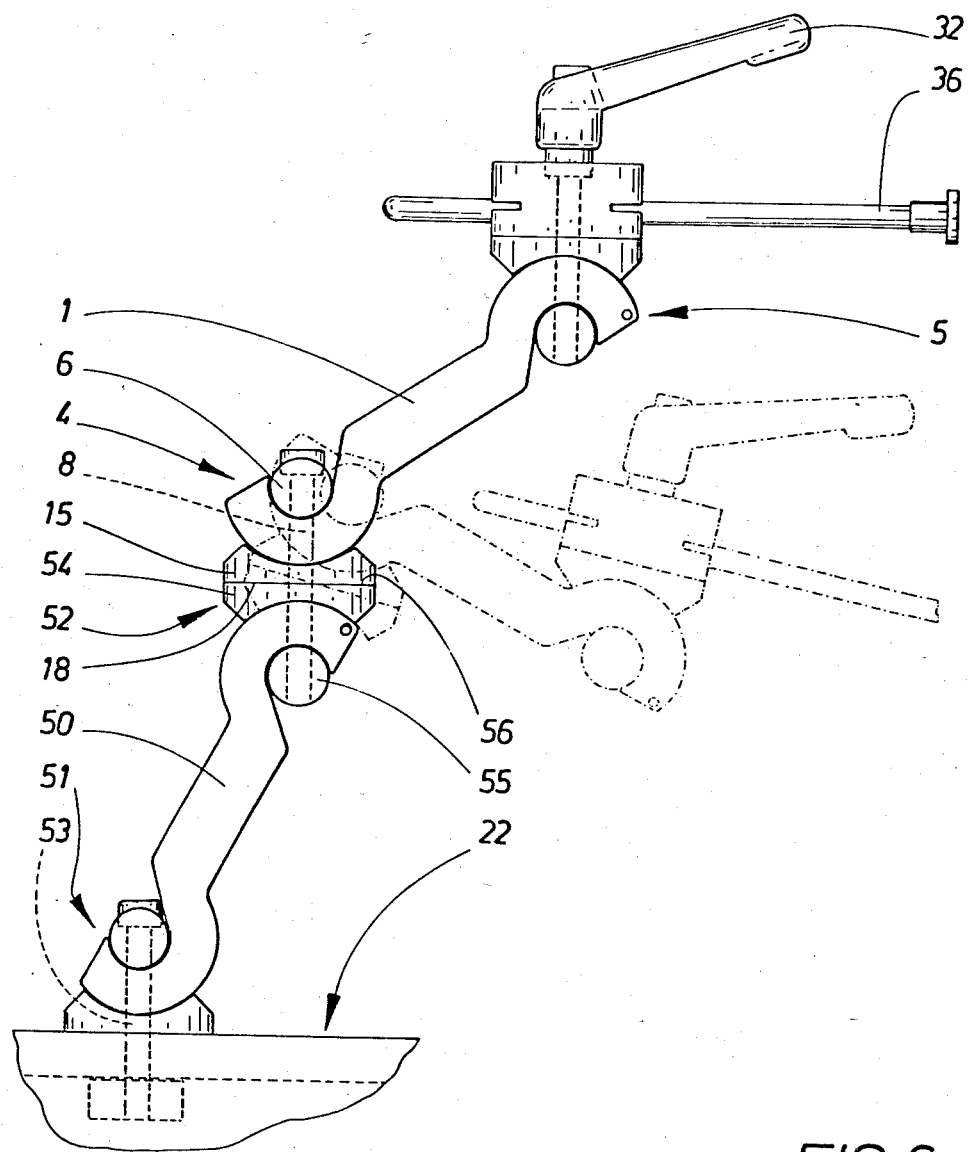
FIG. 6 shows the clamp in a second embodiment in two different positions.
Figure 7:
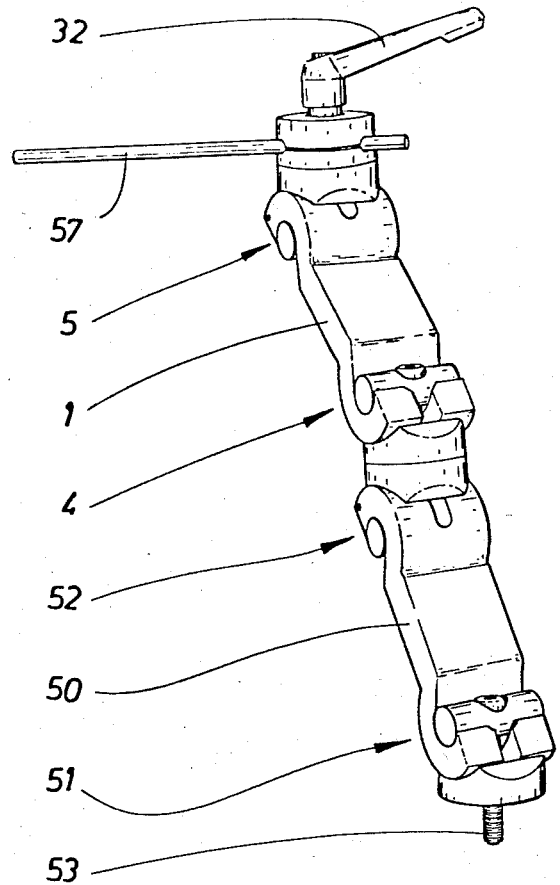
FIG. 7 and FIG. 8 show the clamp in accordance with FIG. 6 in two different perspective views.
Figure 8:
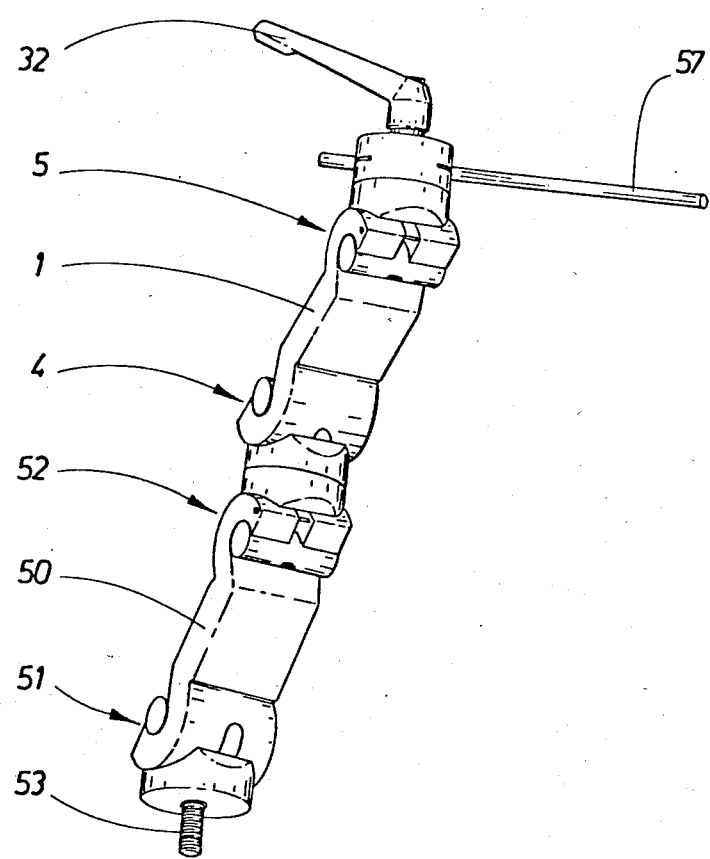

FIGS. 6, 7 and 8 show a second embodiment of the clamp in accordance with the invention. In accordance with this embodiment, the clamp is provided with a further arm 50, which is identical with the first arm and similarly exhibits two articulated arrangements 51, 52 which function in principle in an identical fashion to the articulated arrangements 4, 5 of the first arm. For this purpose, the square nut 25 is transferred from the pivot pin 8 of the first arm to the pivot pin 53 of the second arm, whilst the pivot pin of the first arm extends through the articulated body 54 of the second arm in the articulated arrangement 52 and is screwed into the horizontal pivot pin 55 of the second arm 50. Between the two articulated bodies 15, 54 which face each other is thus formed the flat point of articulation between the flat articulated surface 18 of the upper articulated body 5 and the flat articulated surface 56 of the lower articulated body 54. In this way, a double articulation is thus achieved between the two arms 1, 50 with a common pivot pin 8 and each of the horizontal pivot pins 6, 55. The double articulation thus provides for angular adjustment between the two arms 1, 50 in the vertical plane and also for angular adjustment in the horizontal plane. In addition, parallel movement is also provided between the two arms through the ability of the common pivot pin 8 to be adjusted to a variety of angular positions.

The embodiment with two inter-connected arms 1, 50 illustrated in FIG. 6, FIG. 7 and FIG. 8 offers a greater reach and a greater range of adjustment for the object which is to be supported. Dotted and dashed lines are used to indicate the end position for the angular adjustment between the two arms in the vertical plane. Thus, in FIG. 6, the object shown is in the form of a stop, as in the previous embodiment, whereas FIG. 7 and FIG. 8 show a more general view of a clamping arm 57 which can be used to secure in position any other object. Typical objects are measuring instruments which must be held securely in a precisely determined position, which may vary from case to case. Examples of such instruments are a dial gauge for measuring changes in level or irregularities in the surface of a material. Other examples are lamps for photography, for instance, which must be adjusted to various positions which may vary from case to case.

In a corresponding fashion, the number of arms may be increased further depending on the need for adjustment and reach associated with the clamp. The material used for the arms and the articulated bodies may be a light metal alloy or some other metal, whereas the pivot pins and the articulated bodies are best executed in steel. The operating lever may be executed in plastic, for instance, which may also be used for certain other component parts. It is important, however, for the material used not to be excessively flexible, but to be selected in such a way that the object in question can be held in the desired position without excessive changes in position.

The invention is not restricted to the typical embodiments specified above and illustrated in the drawings, but may be modified within the context of the following Patent Claims. For instance, it is conceivable for the arms 1, 50 and the articulated bodies to be designed with a different appearance. It is also conceivable for the surfaces in the form of a cylinder jacket to be replaced by double-curvature surfaces or other rotationally symmetrical generated surfaces. Also, the articulated clamp on the guide arrangement may be executed in a different fashion depending on the particular application. The clamp may be replaced by a clamping arrangement for clamping to a table top or similar. More than two arms may be connected together in a modular system in which the number of arms is selected to suit each individual case. Additional clamp organs may be inserted between two arms, tht is to say between two articulated bodies 15, for the purpose of supporting several objects simultaneously in different positions. In the above embodiment the clamping arms 36 have been assumed to be the object which is supported and whose position is determined. In the event of other objects being intended, the clamp should also be fitted with a rod-like component which is held in place in the same way as the clamping arm 36 and to which the objects in question are attached. Alternatively, the object may be fitted with a rod-like shaft.

We claim:

1. An adjustable clamp for holding objects securely in position, comprising:
   at least one arm, each arm having two hook-like end portions; and
   two articulated arrangements respectively positioned at said two hook-like end portions;
   one of said articulated arrangements having means for connecting thereto a clamping means for holding the object;
   each articulated arrangement comprising:
   (a) a first convex, partly cylindrical surface at the respective end portion;
   (b) a second, concave, partly cylindrical surface at the respective end portion and spaced from said first surface; said two surfaces being coaxial with each other;
   (c) a first pivot pin having a third, cylindrical surface in contact with and slideable with respect to said second surface;
   (d) a body having:
     (1) a fourth concave, partly cylindrical surface coaxial with said first and second surfaces, and
     (2) a fifth, flat surface in contact with and turnable relative to a corresponding sixth, flat surface; said first surface being in contact with and slideable relative to said fourth surface;
   (e) a second pin extending through the respective hook-like end portion and said body essentially at right angles to said first pin, and forming a pivot axis for said fifth surface relative to said sixth surface, and also forming locking means adjustable between a first position for locking the end portion, pins and surfaces relative to each other in selected positions of said arm, and a releasing position in which said end portion, pins and surfaces are movable relative to each other, and vice versa; one end portion being open in one direction, and the other end portion being open in a direction opposite to said one direction.

2. An adjustable clamp according to claim 1, comprising at least two arms, one articulated arrangement of one arm being connected to an articulated arrangement of another arm.

3. An adjustable clamp according to claim 2, wherein the sixth surface of one articulated arrangement of one arm is in contact with and turnable relative to the sixth surface of one articulated arrangement of the other arm, the second pins of said two articulated arrangements forming one pin and locking means.

4. An adjustable clamp according to any one of claims 1 to 3, wherein the first pin of each articulated arrangement has a bore for receiving therethrough the second pin of the respective articulated arrangement.

* * * * *